United States Patent
Wu (10) Patent No.: US 10,171,963 B2
(45) Date of Patent: Jan. 1, 2019

(54) CALL TRANSFER METHOD AND TERMINAL

(71) Applicant: Huawei Technologies Co., Ltd., Shenzhen (CN)

(72) Inventor: Si Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/540,170

(22) PCT Filed: Dec. 31, 2014

(86) PCT No.: PCT/CN2014/096039
§ 371 (c)(1),
(2) Date: Jun. 27, 2017

(87) PCT Pub. No.: WO2016/106737
PCT Pub. Date: Jul. 7, 2016

(65) Prior Publication Data
US 2017/0359708 A1 Dec. 14, 2017

(51) Int. Cl.
*H04W 4/16* (2009.01)
*H04M 3/42* (2006.01)
(Continued)

(52) U.S. Cl.
CPC .......... *H04W 4/16* (2013.01); *H04M 3/4228* (2013.01); *H04M 3/54* (2013.01); *H04W 4/80* (2018.02); *H04M 2250/04* (2013.01)

(58) Field of Classification Search
CPC ................................ H04W 4/16; H04W 4/008
See application file for complete search history.

(56) References Cited

U.S. PATENT DOCUMENTS 5,579,375 A * 11/1996 Ginter ..................... H04M 3/46
379/211.02
7,116,975 B1 * 10/2006 Link, II .................. H04M 3/54
455/417
(Continued)

FOREIGN PATENT DOCUMENTS

| CN | 102892072 A | 1/2013 |
|---|---|---|
| CN | 103051815 A | 4/2013 |
| CN | 103888614 A | 6/2014 |

OTHER PUBLICATIONS

Foreign Communication From a Counterpart Application, European Application No. 14909544.0, Extended European Search Report dated Oct. 4, 2017, 7 pages.
(Continued)

*Primary Examiner* — Mohammed Rachedine
(74) *Attorney, Agent, or Firm* — Conley Rose, P.C.

(57) ABSTRACT

A call transfer method and terminal are provided. The method includes: sending, by a first terminal, a local number query request to a second terminal by using a near field communication link, where the local number query request is used to request the second terminal to query a local number of the second terminal; receiving, by the first terminal, the local number of the second terminal that is sent by the second terminal; and sending, by the first terminal, a call transfer request to a network side according to the received local number of the second terminal, where the call transfer request is used to request the network side to update a call transfer target of the first terminal to the local number of the second terminal.

18 Claims, 4 Drawing Sheets

---

S101. A first terminal sends a local number query request to a second terminal by using a near field communication link, where the local number query request is used to request the second terminal to query a local number of the second terminal

↓

S102. The first terminal receives the local number of the second terminal that is sent by the second terminal

↓

S103. The first terminal sends a call transfer request to a network side according to the received local number of the second terminal, where the call transfer request is used to request the network side to update a call transfer target of the first terminal to the local number of the second terminal (51) Int. Cl.
*H04W 4/80* (2018.01)
*H04M 3/54* (2006.01)

(56) References Cited

U.S. PATENT DOCUMENTS

| | | |
|---|---|---|
| 2006/0223511 A1 | 10/2006 | Hagale et al. |
| 2006/0246882 A1 | 11/2006 | Frank et al. |
| 2012/0157068 A1 | 6/2012 | Eichen et al. |
| 2013/0115932 A1 | 5/2013 | Williams et al. |
| 2014/0287732 A1* | 9/2014 | Kannan K .............. H04W 4/16 455/417 |
| 2015/0304503 A1* | 10/2015 | Furukawa ............ H04Q 3/0029 455/417 |

OTHER PUBLICATIONS

Machine Translation and Abstract of Chinese Publication No. CN102892072, Jan. 23, 2013, 14 pages.
Machine Translation and Abstract of Chinese Publication No. CN103051815, Apr. 17, 2013, 11 pages.
Machine Translation and Abstract of Chinese Publication No. CN103888614, Jun. 25, 2014, 19 pages.
Foreign Communication From a Counterpart Application, PCT Application No. PCT/CN2014/096039, English Translation of International Search Report dated Aug. 26, 2015, 2 pages.
Foreign Communication From a Counterpart Application, PCT Application No. PCT/CN2014/096039, English Translation of Written Opinion dated Aug. 26, 2015, 5 pages.

* cited by examiner

CALL TRANSFER METHOD AND TERMINAL

CROSS-REFERENCE TO RELATED APPLICATIONS

This application is a National Stage of International Application No. PCT/CN2014/096039, filed on Dec. 31, 2014, which is hereby incorporated by reference in its entirety.

TECHNICAL FIELD

The present disclosure relates to the communications field, and in particular, to a call transfer method and terminal.

BACKGROUND

With popularization of terminal devices, currently when a user cannot answer a call, the user may set call transfer on a terminal to transfer the call to another terminal such that a user that uses the other terminal can answer the call.

When the call-transferred-to terminal is not near the user, the user may miss the call, and the call is unanswered. When the other terminal around the called user receives the transferred call, the user that uses the other terminal cannot know clearly that the called user is nearby, and has no effective and convenient method to find the called user. For example, in a crowd in downtown, although the called user is only 20 meters away from the call-transferred-to user, they cannot find each other in a timely manner. In this case, call transfer efficiency is low, and user experience is poor.

SUMMARY

Embodiments of the present disclosure provide a call transfer method and terminal. According to a first aspect of the present disclosure, a call transfer method is provided and includes sending, by a first terminal, a local number query request to a second terminal using a near field communication link, where the local number query request is used to request the second terminal to query a local number of the second terminal, receiving, by the first terminal, the local number of the second terminal that is sent by the second terminal, and sending, by the first terminal, a call transfer request to a network side according to the received local number of the second terminal, where the call transfer request is used to request the network side to update a call transfer target of the first terminal to the local number of the second terminal.

In a first possible implementation manner, after the first terminal sends the call transfer request to the network side, the first terminal detects, according to a preset period, whether the near field communication link established between the first terminal and the second terminal is valid, and when the near field communication link established between the first terminal and the second terminal is invalid, the first terminal sends a call transfer request to the network side, where the call transfer request is used to request the network side to update the call transfer target of the first terminal to a preset local number.

With reference to the first aspect, in a second possible implementation manner, after the first terminal sends the call transfer request to the network side, the first terminal detects, according to a preset period, whether the first terminal and the second terminal are in a same local area network, and when the first terminal and the second terminal are not in the same local area network, the first terminal sends a call transfer request to the network side, where the call transfer request is used to request the network side to update the call transfer target of the first terminal to a preset local number.

With reference to the first aspect and either of the foregoing possible implementation manners, in a third possible implementation manner, the first terminal detects, in the preset period, whether the first terminal establishes a near field communication link with a third terminal, when the first terminal establishes the near field communication link with the third terminal, the first terminal detects whether the near field communication link established between the first terminal and the second terminal is valid, and when the near field communication link established between the first terminal and the second terminal is invalid, the first terminal sends a call transfer request to the network side, where the call transfer request is used to request the network side to update the call transfer target of the first terminal to a local number of the third terminal.

With reference to the first aspect and any one of the foregoing possible implementation manners, in a fourth possible implementation manner, the first terminal detects, in the preset period, whether the first terminal and a fourth terminal are in a same local area network, when the first terminal and the fourth terminal are in the same local area network, the first terminal detects whether the near field communication link established between the first terminal and the second terminal is valid, and when the near field communication link established between the first terminal and the second terminal is invalid, the first terminal sends a call transfer request to the network side, where the call transfer request is used to request the network side to update the call transfer target of the first terminal to a local number of the fourth terminal.

With reference to the first aspect and any one of the foregoing possible implementation manners, in a fifth possible implementation manner, when the first terminal detects a near field communication link established with at least one terminal, the first terminal obtains a name list of the at least one terminal that establishes the near field communication link, the first terminal sorts the name list of the at least one terminal that establishes the near field communication link, and the first terminal sends a call transfer request to the network side, where the call transfer request is used to request the network side to update the call transfer target of the first terminal to a local number of a first-ranked terminal.

According to a second aspect, a first terminal for call transfer is provided, where the first terminal includes a receiver, a transmitter, and a processor, the transmitter is configured to send a local number query request to a second terminal using a near field communication link, where the local number query request is used to request the second terminal to query a local number of the second terminal, the receiver is further configured to receive the local number of the second terminal that is sent by the second terminal, the processor is configured to generate a call transfer request according to the received local number of the second terminal, and the transmitter is configured to send the call transfer request to a network side according to the received local number of the second terminal, where the call transfer request is used to request the network side to update a call transfer target of the first terminal to the local number of the second terminal.

With reference to the second aspect, in a first possible implementation manner, the processor is further configured to detect, according to a preset period, whether the near field communication link established between the first terminal and the second terminal is valid, and when the near field communication link established between the first terminal and the second terminal is invalid, the transmitter sends a call transfer request to the network side, where the call transfer request is used to request the network side to update the call transfer target of the first terminal to a preset local number.

With reference to the second aspect, in a second possible implementation manner, the processor is further configured to detect, according to a preset period, whether the first terminal and the second terminal are in a same local area network, and when the first terminal and the second terminal are not in the same local area network, the transmitter sends a call transfer request to the network side, where the call transfer request is used to request the network side to update the call transfer target of the first terminal to a preset local number.

With reference to the second aspect, in a third possible implementation manner, in the first terminal, the processor detects, in the preset period, whether the first terminal and a fourth terminal are in a same local area network, when the first terminal and the fourth terminal are in the same local area network, the processor detects whether the near field communication link established between the first terminal and the second terminal is valid, and when the near field communication link established between the first terminal and the second terminal is invalid, the transmitter sends a call transfer request to the network side, where the call transfer request is used to request the network side to update the call transfer target of the first terminal to a local number of the fourth terminal.

With reference to the second aspect and any one of the foregoing possible implementation manners, when the processor detects a near field communication link established with at least one terminal, the processor obtains a name list of the at least one terminal that establishes the near field communication link, the processor sorts the name list of the at least one terminal that establishes the near field communication link, and the transmitter sends a call transfer request to the network side, where the call transfer request is used to request the network side to update the call transfer target of the first terminal to a local number of a first-ranked terminal.

It may be learned from the foregoing technical solutions that the embodiments of the present disclosure have the following advantages. When a user cannot answer a call, the user may transfer call information to a terminal of another user around the user by setting call transfer such that the terminal of the other user around the user can answer the call on the terminal on which the call transfer is set, and the call can be answered even though the user is unavailable or busy.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons skilled in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some, but not all, of the embodiments of the present disclosure. All other embodiments obtained by persons skilled in the art based on the embodiments of the present disclosure without creative efforts shall fall within the protection scope of the present disclosure.

Figure 1:
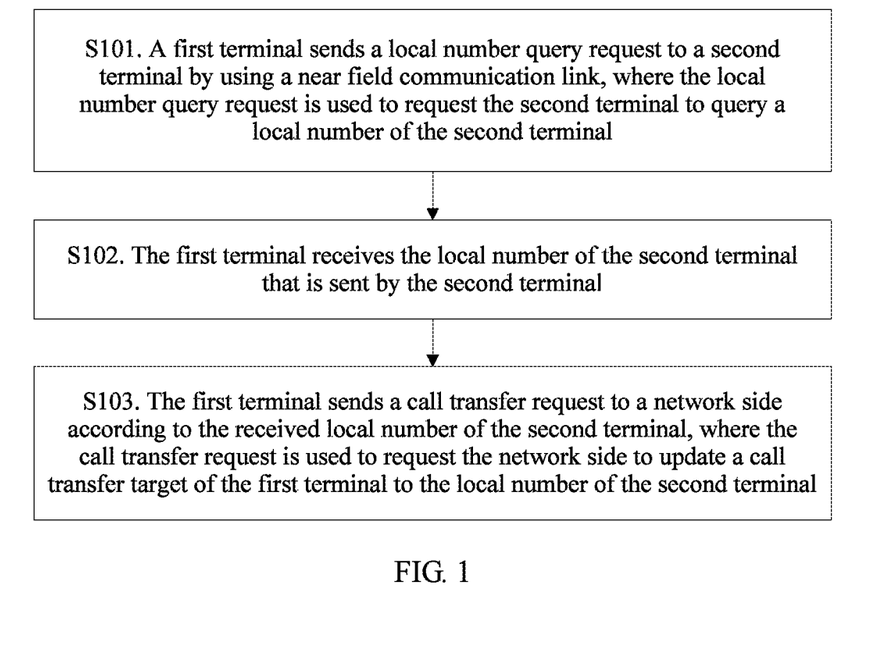
FIG. 1 is a schematic diagram of a call transfer method according to an embodiment of the present disclosure.

An embodiment of the present disclosure provides a call transfer method. A first terminal related in this embodiment of the present disclosure may be a mobile terminal such as a mobile phone or a tablet computer. A second terminal may be a mobile terminal such as a mobile phone, a tablet computer, or a wearable mobile device. FIG. 1 is a schematic diagram of the call transfer method in this embodiment of the present disclosure. As shown in FIG. 1, the method includes the following steps:

S101. The first terminal sends a local number query request to a second terminal using a near field communication link, where the local number query request is used to request the second terminal to query a local number of the second terminal.

On the first terminal, a call transfer option is set by pre-installing an application or presetting a factory service. For example, an option of transferring a call to a neighboring terminal is set. In a scenario of the present disclosure, a user selects the option of transferring a call to a neighboring terminal. A service of transferring a call to a neighboring terminal is running on the first terminal.

Same as the first terminal, the service of transferring a call to a neighboring terminal is also running on the second terminal.

The near field communication link includes but is not limited to Wireless Fidelity (WiFi), BLUETOOTH, near field communication, infrared, or the like.

When the first terminal detects that the near field communication link is valid, the first terminal sends the local number query request to the second terminal using the near field communication link. That the near field communication link is valid means that near field communication manner is available and can be used to transmit data. The local number is a card number of a built-in subscriber identity module (SIM) card in a local terminal, for example, a card number of an 11-digit SIM card provided by CHINA MOBILE. The second terminal may query the local number in an interface invoking manner.

S102. The first terminal receives the local number of the second terminal that is sent by the second terminal.

When running the service of transferring a call to a neighboring terminal, the second terminal queries the local number of the second terminal.

When the second terminal queries the local number of the second terminal, the second terminal sends the local number to the first terminal using the near field communication link.

S103. The first terminal sends a call transfer request to a network side according to the received local number of the second terminal, where the call transfer request is used to request the network side to update a call transfer target of the first terminal to the local number of the second terminal.

When the first terminal receives the local number of the second terminal, the first terminal sends the call transfer request to the network side. The call transfer request is used to request the network side to update the call transfer target of the first terminal to the local number of the second terminal.

In this embodiment of the present disclosure, a first terminal requests a second terminal to query a local number of the second terminal, the second terminal sends the queried local number to the first terminal, and the first terminal requests a network side to update a call transfer target of the first terminal to the local number of the second terminal. In this manner, the first terminal sets the second terminal adjacent to the first terminal as the call transfer target such that a user that uses a call-transferred-to terminal can convey related information of a calling party to a user that uses a call transfer terminal, call transfer efficiency is improved, and user experience is improved.

Figure 2:
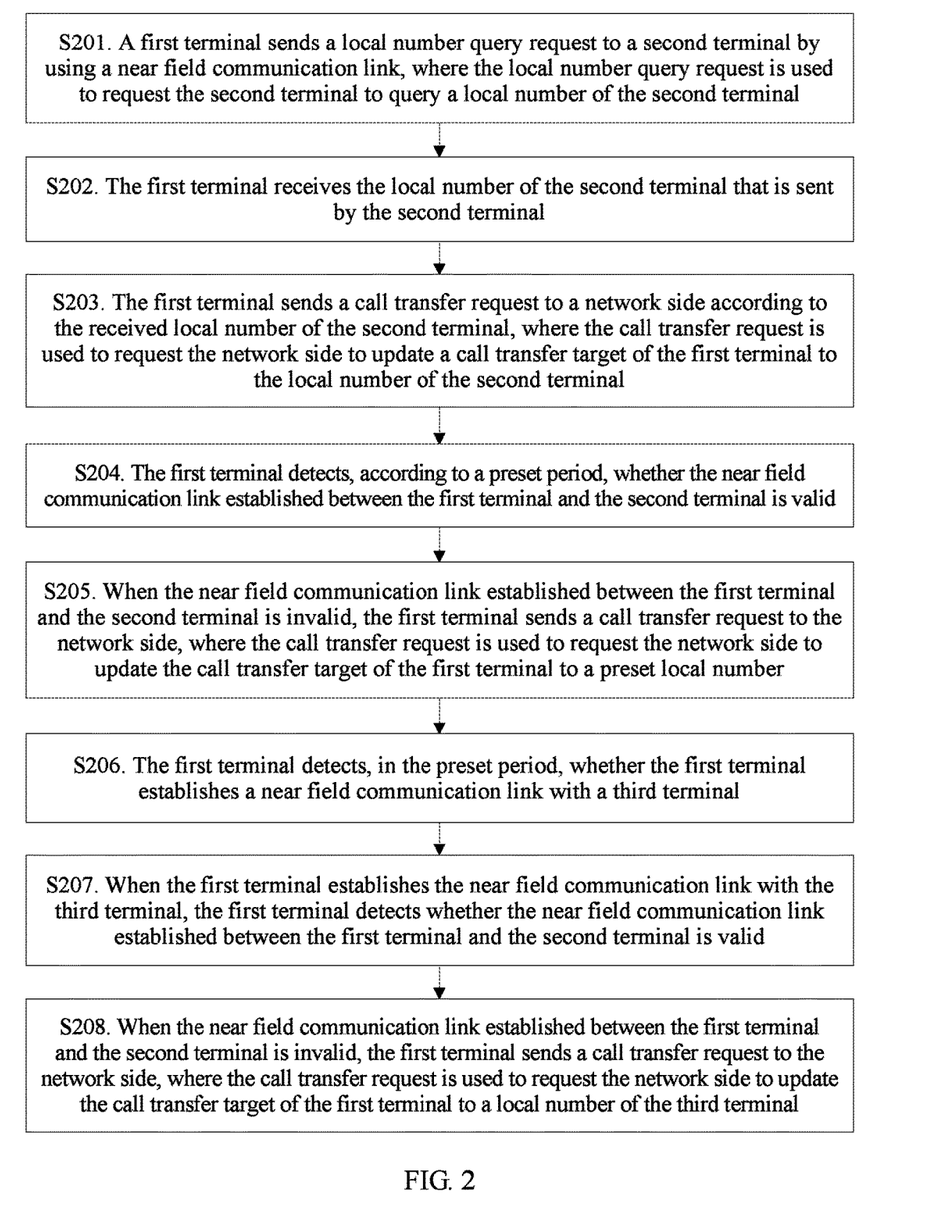
FIG. 2 is a schematic diagram of a call transfer method according to another embodiment of the present disclosure.

FIG. 2 is a schematic diagram of a call transfer method according to another embodiment of the present disclosure. As shown in FIG. 2, the method includes the following steps:

S201. A first terminal sends a local number query request to a second terminal using a near field communication link, where the local number query request is used to request the second terminal to query a local number of the second terminal.

S202. The first terminal receives the local number of the second terminal that is sent by the second terminal.

S203. The first terminal sends a call transfer request to a network side according to the received local number of the second terminal, where the call transfer request is used to request the network side to update a call transfer target of the first terminal to the local number of the second terminal.

Steps S201 to S203 are the same as steps S101 to S103, and details are not described herein again.

S204. The first terminal detects, according to a preset period, whether the near field communication link established between the first terminal and the second terminal is valid.

In this embodiment of the present disclosure, the preset period is set according to statistics before delivery. The preset period refers to a time period when the near field communication link established between the first terminal and the second terminal remains valid. For example, the preset period may be one hour, or two hours.

The detecting whether the near field communication link established between the first terminal and the second terminal is valid may be when the near field communication link is a BLUETOOTH connection, detecting whether the BLUETOOTH connection is still established between the first terminal and the second terminal.

S205. When the near field communication link established between the first terminal and the second terminal is invalid, the first terminal sends a call transfer request to the network side, where the call transfer request is used to request the network side to update the call transfer target of the first terminal to a preset local number.

The preset local number is a local number of a home fixed-line phone or an office fixed-line phone that is set by a user, and the preset local number is a local number for call transfer that is initially set by the user.

S206. The first terminal detects, in the preset period, whether the first terminal establishes a near field communication link with a third terminal.

In this embodiment of the present disclosure, in the preset period, the first terminal constantly detects whether the first terminal establishes the near field communication link with the third terminal. For example, the first terminal detects whether the first terminal establishes BLUETOOTH pairing with the third terminal, or the first terminal detects whether the first terminal accesses a WiFi network established by the third terminal.

S207. When the first terminal establishes the near field communication link with the third terminal, the first terminal detects whether the near field communication link established between the first terminal and the second terminal is valid.

A BLUETOOTH connection is used as an example of near field communication. The first terminal first detects that the first terminal establishes a BLUETOOTH connection with the third terminal. In this case, the first terminal detects whether the BLUETOOTH connection established between the first terminal and the second terminal remains valid.

S208. When the near field communication link established between the first terminal and the second terminal is invalid, the first terminal sends a call transfer request to the network side, where the call transfer request is used to request the network side to update the call transfer target of the first terminal to a local number of the third terminal.

When the BLUETOOTH connection established between the first terminal and the second terminal is invalid, the first terminal sends the call transfer request to the network side, to request the network side to update the call transfer target of the first terminal to the local number of the third terminal.

In another embodiment of the present disclosure, after another terminal becomes a call transfer target, when a call is transferred to the other terminal and answered by the other terminal, reminder information may be sent to the first terminal over an operator network. For example, a short messaging service (SMS) message may be sent over the operator network to the first terminal in a short message service manner. The reminder information is used to remind a user that uses the first terminal that the other terminal answers the call, or remind a user that uses the first terminal whether a user of the other terminal that answers the call is in a same cell with the first terminal, or remind a user that uses the first terminal of global positioning system (GPS) geographic information of a user of the other terminal that answers the call. The reminder information may be an SMS message, WECHAT, or a ring tone.

In this embodiment of the present disclosure, a first terminal requests a second terminal to query a local number of the second terminal, the second terminal sends the queried local number to the first terminal, and the first terminal requests a network side to update a call transfer target of the first terminal to the local number of the second terminal, detects, according to a preset period, whether the near field communication link established between the first terminal and the second terminal is valid, and updates the call transfer target when the near field communication link is invalid. In this manner, the first terminal sets the second terminal adjacent to the first terminal as the call transfer target such that a user that uses a call-transferred-to terminal can convey related information of a calling party to a user that uses a call transfer terminal, call transfer efficiency is improved, and user experience is improved. Further, when it is detected that the near field communication link fails, the call transfer target is updated. Call transfer validity is ensured when a terminal adjacent to a terminal that maintains call transfer is not near the call transfer terminal.

Figure 3:
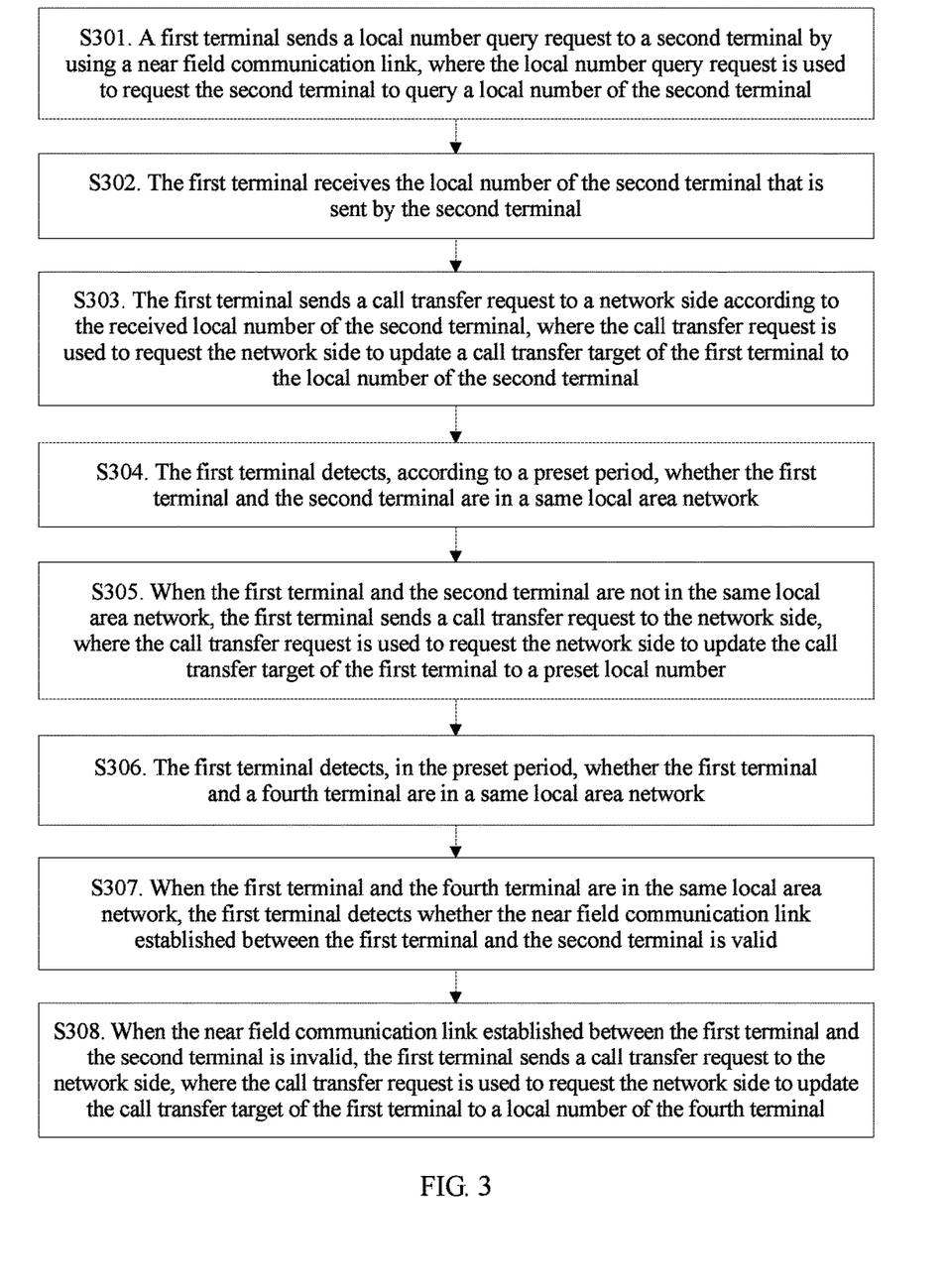
FIG. 3 is a schematic diagram of a call transfer method according to another embodiment of the present disclosure.

FIG. 3 is a schematic diagram of a call transfer method according to another embodiment of the present disclosure. As shown in FIG. 3, the method includes the following steps:

S301. A first terminal sends a local number query request to a second terminal using a near field communication link, where the local number query request is used to request the second terminal to query a local number of the second terminal.

S302. The first terminal receives the local number of the second terminal that is sent by the second terminal.

S303. The first terminal sends a call transfer request to a network side according to the received local number of the second terminal, where the call transfer request is used to request the network side to update a call transfer target of the first terminal to the local number of the second terminal.

Steps S301 to S303 are the same as steps S101 to S103, and details are not described herein again.

S304. The first terminal detects, according to a preset period, whether the first terminal and the second terminal are in a same local area network.

The first terminal may determine, in a ping command manner, whether the first terminal and the second terminal are in the same local area network.

S305. When the first terminal and the second terminal are not in the same local area network, the first terminal sends a call transfer request to the network side, where the call transfer request is used to request the network side to update the call transfer target of the first terminal to a preset local number.

When the first terminal determines, in the ping command manner, that the first terminal and the second terminal are not in the same local area network, the first terminal sends the call transfer request to the network side.

S306. The first terminal detects, in the preset period, whether the first terminal and a fourth terminal are in a same local area network.

Similarly, the first terminal determines, in a ping command manner, whether the first terminal and the fourth terminal are in the same local area network.

S307. When the first terminal and the fourth terminal are in the same local area network, the first terminal detects whether the near field communication link established between the first terminal and the second terminal is valid.

When the first terminal determines, in the ping command manner, that the first terminal and the fourth terminal are in the same local area network, the first terminal detects whether the near field communication link established between the first terminal and the second terminal is valid.

S308. When the near field communication link established between the first terminal and the second terminal is invalid, the first terminal sends a call transfer request to the network side, where the call transfer request is used to request the network side to update the call transfer target of the first terminal to a local number of the fourth terminal.

In another embodiment of the present disclosure, when the first terminal detects a near field communication link established with at least one terminal, the first terminal obtains a name list of the at least one terminal that establishes the near field communication link.

The first terminal sorts the name list of the at least one terminal that establishes the near field communication link.

The first terminal sends a call transfer request to the network side, where the call transfer request is used to request the network side to update the call transfer target of the first terminal to a local number of a first-ranked terminal.

In another embodiment of the present disclosure, cell information may be determined using a core network of an operator with which the first terminal is registered, to determine distance information between the first terminal and another terminal in a same cell. Information about a terminal closest to the first terminal may be determined using the core network, and a terminal name list of other terminals closest to the first terminal is established.

The information about a terminal may be a local number of a terminal closest to the first terminal.

The call transfer target of the first terminal may be updated to a local number of a first-ranked terminal in the terminal name list of other terminals closest to the first terminal using the core network.

In another embodiment of the present disclosure, a location server is added on an Internet side, and the location server may obtain GPS information of the first terminal and GPS information of other terminals around the first terminal. The location server may determine a list of local numbers of the other terminals around the first terminal according to the obtained GPS information of the first terminal and the GPS information of the other terminals around the first terminal. The list of local numbers is sorted to determine, in the list, a local number of a first-ranked terminal in the other terminals closest to the first terminal. The call transfer target of the first terminal is updated to the local number of the first-ranked terminal.

In this embodiment of the present disclosure, a first terminal requests a second terminal to query a local number of the second terminal, the second terminal sends the queried local number to the first terminal, and the first terminal requests a network side to update a call transfer target of the first terminal to the local number of the second terminal, detects, according to a preset period, whether the first terminal and the second terminal are in a same local area network, and updates the call transfer target when the first terminal and the second terminal are not in the same local area network. In this manner, the first terminal sets the second terminal adjacent to the first terminal as the call transfer target such that a user that uses a call-transferred-to terminal can convey related information of a calling party to a user that uses a call transfer terminal, call transfer efficiency is improved, and user experience is improved. Further, when the first terminal and the second terminal are not in the same local area network, the call transfer target is updated. Call transfer validity is ensured when a terminal adjacent to a terminal that maintains call transfer is not near the call transfer terminal.

Figure 4:
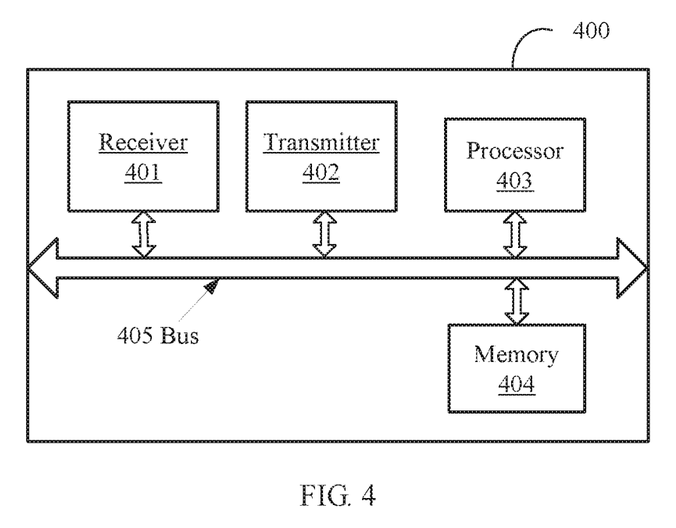
FIG. 4 is a schematic diagram of a first terminal 400 for call transfer according to an embodiment of the present disclosure.

FIG. 4 is a schematic diagram of a first terminal 400 for call transfer according to an embodiment of the present disclosure. As shown in FIG. 4, the first terminal 400 includes a receiver 401, a transmitter 402, a processor 403, a memory 404, and a bus 405.

The first terminal 400 may be a terminal device such as a mobile phone or a tablet computer.

A second terminal related in this embodiment of the present disclosure may be a terminal device such as a mobile phone, a personal computer (PC), a tablet computer, or a wearable mobile device.

A structure of the first terminal shown in FIG. 4 is only used as an example of an implementation manner, and does not constitute a limitation on the first terminal. The first terminal may include more or less components than components shown in the figure, or may combine some components, or may have different component deployments.

The memory 404 may include a random access memory (RAM) and a read-only memory (ROM), or any fixed storage medium, or a removable storage medium, and is configured to store a program that can execute this embodiment of the present disclosure or store an application database in this embodiment of the present disclosure. Using the bus 405, the memory 404 receives input from another component, or another component invokes stored information, such as a preset period or an instruction for sending a call transfer request to a network side.

The processor 403 is configured to execute the program stored in the memory 404 for this embodiment of the present disclosure, and perform bidirectional communication with another apparatus using the bus 405.

The processor 403 and the memory 404 may be integrated as a physical module that implements this embodiment of the present disclosure, and the program that implements this embodiment of the present disclosure is stored in and runs on the physical module.

All components of the first terminal 400 are coupled together using a bus system 405. In addition to a data bus, the bus 405 may further include a power bus, a control bus, a status signal bus, or the like. However, for clarity of description, various buses are marked as the bus 405 in the figure.

In this embodiment of the present disclosure, units of the first terminal 400 separately execute the following content.

The transmitter 402 is configured to send a local number query request to the second terminal using a near field communication link, where the local number query request is used to request the second terminal to query a local number of the second terminal.

The receiver 401 is further configured to receive the local number of the second terminal that is sent by the second terminal.

The processor 403 is configured to generate a call transfer request according to the received local number of the second terminal.

The transmitter 402 is configured to send the call transfer request to the network side according to the received local number of the second terminal, where the call transfer request is used to request the network side to update a call transfer target of the first terminal 400 to the local number of the second terminal.

In another embodiment of the present disclosure, the processor 403 is configured to detect, according to the preset period, whether the near field communication link established between the first terminal 400 and the second terminal is valid.

When the near field communication link established between the first terminal 400 and the second terminal is invalid, the transmitter 402 sends a call transfer request to the network side, where the call transfer request is used to request the network side to update the call transfer target of the first terminal 400 to a preset local number.

In another embodiment of the present disclosure, the processor 403 is further configured to detect, according to the preset period, whether the first terminal 400 and the second terminal are in a same local area network.

When the first terminal 400 and the second terminal are not in the same local area network, the transmitter 402 sends a call transfer request to the network side, where the call transfer request is used to request the network side to update the call transfer target of the first terminal 400 to a preset local number.

In another embodiment of the present disclosure, in the first terminal, the processor 403 detects, in the preset period, whether the first terminal 400 and a fourth terminal are in a same local area network.

When the first terminal and the fourth terminal are in the same local area network, the processor 403 detects whether the near field communication link established between the first terminal 400 and the second terminal is valid.

When the near field communication link established between the first terminal 400 and the second terminal is invalid, the transmitter 402 sends a call transfer request to the network side, where the call transfer request is used to request the network side to update the call transfer target of the first terminal 400 to a local number of the fourth terminal.

In another embodiment of the present disclosure, in the first terminal 400, the processor detects, in the preset period, whether the first terminal 400 and a fourth terminal are in a same local area network.

When the first terminal 400 and the fourth terminal are in the same local area network, the processor 403 detects whether the near field communication link established between the first terminal and the second terminal is valid.

When the near field communication link established between the first terminal 400 and the second terminal is invalid, the transmitter 402 sends a call transfer request to the network side, where the call transfer request is used to request the network side to update the call transfer target of the first terminal 400 to a local number of the fourth terminal.

In this embodiment of the present disclosure, a first terminal requests a second terminal to query a local number of the second terminal, the second terminal sends the queried local number to the first terminal, and the first terminal requests a network side to update a call transfer target of the first terminal to the local number of the second terminal, detects, according to a preset period, whether the first terminal and the second terminal are in a same local area network, and updates the call transfer target when the first terminal and the second terminal are not in the same local area network. In this manner, the first terminal sets the second terminal adjacent to the first terminal as the call transfer target such that a user that uses a call-transferred-to terminal can convey related information of a calling party to a user that uses a call transfer terminal, call transfer efficiency is improved, and user experience is improved. Further, when the first terminal and the second terminal are not in the same local area network, the call transfer target is updated. Call transfer validity is ensured when a terminal adjacent to a terminal that maintains call transfer is not near the call transfer terminal.

Persons of ordinary skill in the art may be aware that, in combination with the examples described in the embodiments disclosed in this specification, units, algorithms and method steps may be implemented by a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, the foregoing mobile terminal and access terminal separately perform a working process in the described method embodiments of the present disclosure, and for specific working, reference may be made to a corresponding process in the foregoing method embodiments, and details are not described herein again.

In the several embodiments provided in the present application, the disclosed server and method may be implemented in other manners. For example, the described server embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

The foregoing descriptions are merely specific implementation manners of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A call transfer method, comprising:
   sending, by a first terminal, a local number query request to a second terminal using a near field communication link, wherein the local number query request requests the second terminal to query a local number of the second terminal;
   receiving, by the first terminal, the local number of the second terminal from the second terminal; and
   sending, by the first terminal, a call transfer request to a network side according to the local number of the second terminal, wherein the call transfer request requests the network side to update a call transfer target of the first terminal to the local number of the second terminal, and
   wherein after sending, by the first terminal, the call transfer request to the network side, the method further comprises:
   detecting, by the first terminal according to a preset period, whether the near field communication link established between the first terminal and the second terminal is valid, wherein valid means that near field communication manner is available and ca be used to transmit data; and
   sending, by the first terminal, a second call transfer request to the network side when the near field communication link established between the first terminal and the second terminal is invalid, wherein the second call transfer request requests that the network side update the call transfer target of the first terminal to a preset local number.

2. The method according to claim 1, wherein after sending, by the first terminal, the call transfer request to the network side, the method further comprises:
   detecting, by the first terminal according to the preset period, whether the first terminal and the second terminal are in a same local area network; and
   sending, by the first terminal, the second call transfer request to the network side, wherein the second call transfer request requests that the network side update the call transfer target of the first terminal to the preset local number.

3. The method according to claim 2, further comprising:
   detecting, by the first terminal, in the preset period whether the first terminal and a fourth terminal are in the same local area network;
   detecting, by the first terminal, whether the near field communication link established between the first terminal and the second terminal is valid when the first terminal and the fourth terminal are in the same local area network; and
   sending, by the first terminal, a third call transfer request to the network side when the near field communication link established between the first terminal and the second terminal is invalid, wherein the third call transfer request requests that the network side update the call transfer target of the first terminal to a local number of the fourth terminal.

4. The method according to claim 1, further comprising:
   detecting, by the first terminal, whether the first terminal establishes a second near field communication link with a third terminal;
   detecting, by the first terminal, whether the near field communication link established between the first terminal and the second terminal is valid when the first terminal establishes the second near field communication link with the third terminal; and
   sending, by the first terminal, the second call transfer request to the network side, wherein the second call transfer request requests that the network side update the call transfer target of the first terminal to a local number of the third terminal when the near field communication link established between the first terminal and the second terminal is invalid.

5. The method according to claim 1, further comprising:
   detecting, by the first terminal, whether the first terminal establishes a second near field communication link with a third terminal when the near field communication link established between the first terminal and the second terminal is invalid; and
   sending, by the first terminal, the second call transfer request to the network side when the first terminal establishes the second near field communication link with the third terminal, wherein the second call transfer request requests that the network side update the call transfer target of the first terminal to a local number of the third terminal.

6. The method according to claim 1, further comprising:
detecting, by the first terminal, in the preset period whether the first terminal and a fourth terminal are in a same local area network when the near field communication link established between the first terminal and the second terminal is invalid; and
sending, by the first terminal, the second call transfer request to the network side when the first terminal and the fourth terminal are in the same local area network, wherein the second call transfer request requests that the network side update the call transfer target of the first terminal to a local number of the fourth terminal.

7. The method according to claim 1, further comprising:
obtaining, by the first terminal, a name list of at least one terminal that establishes the near field communication link when the first terminal detects that the least one near field communication link is established with the at least one terminal;
sorting, by the first terminal, the name list of the at least one terminal that establishes the near field communication link; and
sending, by the first terminal, the second call transfer request to the network side, wherein the second call transfer request requests that the network side update the call transfer target of the first terminal to a local number of a first-ranked terminal.

8. The method according to claim 1, further comprising:
obtaining, by the first terminal, a name list of at least one terminal that establishes the near field communication link when the first terminal detects that least one near field communication link is established with the at least one terminal;
sorting, by the first terminal, the name list of the at least one terminal that establishes the near field communication link; and
sending, by the first terminal, a third call transfer request to the network side, wherein the third call transfer request requests that the network side update the call transfer target of the first terminal to a local number of a first-ranked terminal.

9. The method according to claim 1, wherein the local number of the second terminal comprises a card number of a subscriber identity module (SIM) card of the second terminal.

10. The method according to claim 1, wherein the near field communication link comprises a WI-FI link between the first terminal and the second terminal, or wherein the near field communication link comprises a BLUETOOTH link between the first terminal and the second terminal.

11. A terminal for call transfer, comprising:
a transmitter configured to send a local number query request to a first terminal using a near field communication link, wherein the local number query request requests that the first terminal query a local number of the first terminal;
a receiver configured to receive the local number of the first terminal from the first terminal; and
a processor coupled to the transmitter and the receiver, wherein the processor is configured to generate a call transfer request according to the received local number of the first terminal,
wherein the transmitter is further configured to send the call transfer request to a network side according to the received local number of the first terminal,
wherein the call transfer request requests the network side to update a call transfer target of the terminal to the local number of the first terminal,
wherein the processor is further configured to detect, according to a preset period, whether the near field communication link established between the terminal and the first terminal is valid,
wherein valid means that near field communication manner is available and can be used to transmit data,
wherein the transmitter is further configured to send a second call transfer request to the network side when the near field communication link established between the terminal and the first terminal is invalid, and
wherein the second call transfer request requests that the network side update the call transfer target of the terminal to a preset local number.

12. The terminal according to claim 11, wherein the processor is further configured to detect, according to the preset period, whether the terminal and the first terminal are in a same local area network, wherein the transmitter is further configured to send the second call transfer request to the network side when the terminal and the first terminal are not in the same local area network, and wherein the call second transfer request requests that the network side update the call transfer target of the terminal to the preset local number.

13. The terminal according to claim 12, wherein the processor is further configured to:
detect, in the preset period, whether the terminal and a third terminal are in the same local area network; and
detect whether the near field communication link established between the terminal and the first terminal is valid when the terminal and the third terminal are in the same local area network,
wherein the transmitter is further configured to send a third call transfer request to the network side when the near field communication link established between the terminal and the first terminal is invalid, and
wherein the third call transfer request requests that the network side update the call transfer target of the terminal to a local number of the third terminal.

14. The terminal according to claim 11, wherein the processor is further configured to:
detect whether the terminal establishes a second near field communication link with a second terminal; and
detect whether the near field communication link established between the terminal and the first terminal is valid when the terminal establishes the second near field communication link with the second terminal,
wherein the transmitter is further configured to send the second call transfer request to the network side when the near field communication link established between the terminal and the first terminal is invalid, and
wherein the second call transfer request requests that the network side update the call transfer target of the terminal to a local number of the third terminal.

15. The terminal according to claim 11, wherein the processor is further configured to detect whether the terminal establishes a second near field communication link with a second terminal when the near field communication link established between the terminal and the first terminal is invalid, wherein the transmitter is further configured to send the second call transfer request to the network side when the terminal establishes the second near field communication link with the second terminal, and wherein the second call transfer request requests that the network side update the call transfer target of the first terminal to a local number of the second terminal.

16. The method according to claim 11, wherein the processor is further configured to detect whether the terminal and a third terminal are in a same local area network when the near field communication link established between the terminal and the first terminal is invalid, wherein the transmitter is further configured to send the second call transfer request to the network side when the terminal and the third terminal are in the same local area network, and wherein the second call transfer request requests that the network side update the call transfer target of the terminal to a local number of the third terminal.

17. The terminal according to claim 11, wherein when the processor is further configured to:
    detect that the near field communication link is established with at least one terminal;
    obtain a name list of the at least one terminal that establishes the near field communication link; and
    sort the name list of the at least one terminal that establishes the near field communication link,
    wherein the transmitter is further configured to send the second call transfer request to the network side, and
    wherein the second call transfer request requests that the network side update the call transfer target of the terminal to a local number of a first-ranked terminal.

18. The terminal according to claim 11, wherein the processor is further configured to:
    detect that the near field communication link is established with at least one terminal;
    obtain a name list of the at least one terminal that establishes the near field communication link; and
    sort the name list of the at least one terminal that establishes the near field communication link,
    wherein the transmitter is further configured to send a third call transfer request to the network side, and
    wherein the third call transfer request requests that network side update the call transfer target of the terminal to a local number of a first-ranked terminal.

* * * * *

UNITED STATES PATENT AND TRADEMARK OFFICE
CERTIFICATE OF CORRECTION

PATENT NO. : 10,171,963 B2
APPLICATION NO. : 15/540170
DATED : January 1, 2019
INVENTOR(S) : Si Wu Page 1 of 1

It is certified that error appears in the above-identified patent and that said Letters Patent is hereby corrected as shown below:

In the Claims

Column 11, Claim 1, Line 65, thru Column 12, Line 3, should read:
detecting, by the first terminal according to a preset period, whether the near field communication link established between the first terminal and the second terminal is valid, wherein valid means that near field communication manner is available and can be used to transmit data; and Signed and Sealed this
Thirtieth Day of April, 2019

Andrei Iancu
*Director of the United States Patent and Trademark Office*